United States Patent [19]

Kignell

[11] Patent Number: 4,808,264
[45] Date of Patent: Feb. 28, 1989

[54] PROCESS FOR CHEMICALS AND ENERGY RECOVERY FROM WASTE LIQUORS

[76] Inventor: Jean-Erik Kignell, Backvägen 10, Upplands Väsby, Sweden, S-194 40

[21] Appl. No.: 15,137
[22] PCT Filed: May 30, 1986
[86] PCT No.: PCT/SE86/00249
 § 371 Date: Jan. 28, 1987
 § 102(e) Date: Jan. 28, 1987
[87] PCT Pub. No.: WO86/07396
 PCT Pub. Date: Dec. 18, 1986

[30] Foreign Application Priority Data

Jun. 3, 1985 [SE] Sweden .................................. 8502731

[51] Int. Cl.⁴ .............................................. D21C 11/12
[52] U.S. Cl. ...................... 162/30.1; 162/30.11; 162/31; 162/47; 423/DIG. 3
[58] Field of Search .................. 162/30.1, 30.11, 15, 162/16, 47, 31; 423/DIG. 3

[56] References Cited

U.S. PATENT DOCUMENTS

| | | | |
|---|---|---|---|
| 3,043,655 | 9/1962 | Green et al. | 162/30.11 |
| 3,816,239 | 6/1974 | Marks | 162/15 |
| 3,867,251 | 2/1975 | Holme | 162/30.1 |
| 4,048,286 | 9/1977 | Rossmaier | 162/30.1 |
| 4,431,617 | 2/1984 | Farin | 162/30.1 |
| 4,601,786 | 7/1986 | Santén et al. | 162/30.1 |
| 4,668,341 | 5/1987 | Nilsson | 162/47 |

OTHER PUBLICATIONS

Thomas; TAPPI, Feb. 1979, vol. 62, No. 2, pp. 51–57; "Process Simulation Program".

Primary Examiner—Steve Alvo
Attorney, Agent, or Firm—Brumbaugh, Graves, Donohue & Raymond

[57] ABSTRACT

Process for recovering chemicals and energy from cellulose waste liquors preferably black kraft liquor obtained in a paper pulp sulphate process, comprising the following, three distinct and separate steps: In the first step the concentrated black liquor is gasified in a pressurized gasification reactor by so called flash-pyrolysis at 700° to 1300° C., normally 800°–900° C., whereby an energy rich gas is produced, and in which the inorganic chemicals of the black liquor are contained in the form of molten suspended droplets, mainly comprising sodium carbonate and sodium sulphide. In the second step the gas from the gasification reactor is rapidly cooled through direct contact with water, and with green liquor, which is formed when the molten droplets and the hydrogen sulphide are dissolved in the quench liquid. The cooled gas subsequently passes through a scrubber. In the lower section of the scrubber the gas is washed with circulating green liquor, and in the upper section of the scrubber the gas is washed with sodium hydroxide (or carbonate) solution and water for complete removal of any remaining sulfur bearing components in the gas. In the third step the now sulfur and particulate-free gas is used as a fuel for generating steam and, if it should be economically justified, also for production of electric power.

13 Claims, 1 Drawing Sheet

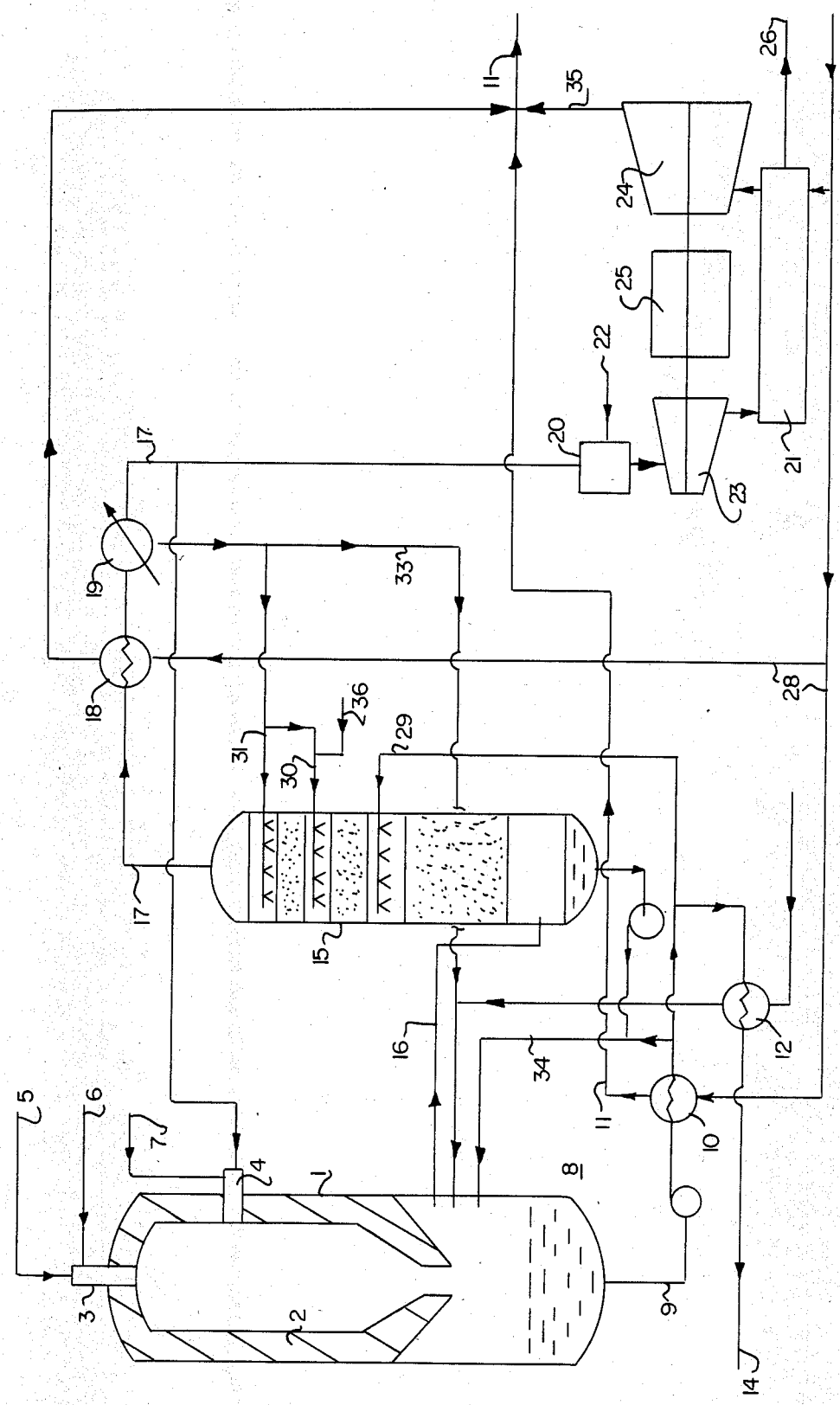

PROCESS FOR CHEMICALS AND ENERGY RECOVERY FROM WASTE LIQUORS

TECHNICAL FIELD

The present invention relates to a process for recovering cooking chemicals and energy from cellulose waste liquors obtained in the pulp and paper industry.

The object of the present invention is to recover chemicals and energy from waste liquors preferably black kraft liquors obtained in the pulp and paper industry, and in particular the pulp and paper industry producing according to the sulphate method, whereby a more specific object is to eliminate prior art known problems in the use of huge and technically and operationally complicated combustion furnaces in the recovery of chemicals and energy, and polluting the air with primarily sulfur containing exhaust gases, i e to recover substantially all chemicals and energy present in waste liquors in an efficient and environmentally attractive way.

The term waste liquors used herein means preferably black kraft liquor but includes waste liquors obtained from the sodium bisulfite and sodium carbonate processes as well. In the following the term waste liquors and black kraft liquor are used synonymously.

BACKGROUND OF THE INVENTION

When producing paper pulp a digestion liquor called black kraft liquor is obtained, which liquor besides numerous solubilized organic materials also contains the chemicals used for digesting the wooden raw material, i e sodium hydroxide and sodium sulphide, now mainly in the form of sodium carbonate and sodium sulphate. The black kraft liquor is generally concentrated before combustion for recovery of the energy content of the organic matter and for recovery of the cooking chemicals as so called green liquor.

Different processes have been proposed for recovering the energy and cooking chemicals, whereby the Tomlinson process is one, using a huge combustion furnace with steam raising heat recovery. Another proposed process is the so called cyclone combustion process, in which pyrolysis and combustion of the organic material takes place in a cyclone chamber. This latter process has, however, not gained any commercial success so far, and has only been tested in pilot plant.

DESCRIPTION OF THE PRESENT INVENTION

It has now by this invention been found possible to eliminate prior art known drawbacks, and to be able to recover essentially all of the chemicals and energy present in the black kraft liquor, i e to minimize losses, by a novel and elegant process, which is characterized as follows.

(i) introduction of the black kraft liquor into a pressurized gasification reactor, while being atomized and being subjected to a flash-pyrolysis, while mainly forming CO, $CO_2$, $H_2$, $H_2S$, $Na_2CO_3$ and $Na_2S$.

(ii) introduction of oxygen or oxygen containing gas, preferably at some distance from the point of introducing black kraft liquor into said reactor, in order to support the endothermal pyrolysis reactions by combustion of a part of the gas formed by the pyrolysis of the organic matter present in the black kraft liquor. Optionally introducing a support fuel such as oil or gas to said reactor, if needed, for maintaining the heat balance around said reactor.

(iii) maintaining in said reactor a temperature of 700° to 1300° C., preferably 800° to 1000° C. to achieve complete gasification of the organic content of the black liquor and to form droplets of melted inorganic chemicals, mainly comprising $Na_2CO_3$ and $Na_2S$.

(iv) transporting said melt of chemicals out of said reactor by means of the rapid gas flow obtained during said gasification and cooling said gas and melt of chemicals, mainly in the form of droplets, in an aqueous quench solution.

(v) washing said gas with regard to its contents of solubilizable inorganic chemicals using an alkaline solution such as sodium carbonate/sodium sulphide solution (green liquor), sodium hydroxide (or carbonate) solution, and water in adequate order for dissolving said inorganic chemicals and as complete absorption as possible of the sulfur bearing compounds in the pyrolysis gas.

(vi) removing remaining gas and using it as an exceptionally clean fuel for generation of steam and/or electric power, preferably in a so called combined gas turbine/steam turbine cycle.

Further characteristics are evident from the accompanying claims.

The key feature of the novel concept described herein is that the recovery of chemicals and energy from the concentrated kraft black liquor is carried out in three distinct and separate steps.

In the first step the concentrated black liquor is gasified in a pressurized gasification reactor by so called flash-pyrolysis at 700° to 1300° C., preferably 800° to 1000° C., normally 800° to 900° C., whereby an energy rich gas is produced and in which the inorganic chemicals of the black liquor are contained in the form of molten suspended droplets, mainly comprising sodium carbonate and sodium sulfide.

In the second step the gas from the gasification reactor is rapidly cooled through direct contact with water, and with green liquor, which is formed when the molten droplets and the hydrogen sulphide are dissolved in the quench liquid. The cooled gas subsequently passes through a scrubber. In the lower section of the scrubber the gas is washed with circulating green liquor and in the upper section of the scrubber the gas is washed with a sodium hydroxide (or carbonate) solution and water for complete removal of any remaining sulfur bearing components in the gas.

In the third step the now sulfur and particulates-free gas is used as a fuel for generating steam and, if it should be economically justified, also for production of electric power.

By conducting the first steps of the process described above at elevated pressure, as at a level of about 3 to 150 bars, preferably 10 to 100 bars, more preferably 30 to 50 bars, the following major advantages are gained, viz.

Compact process equipment with high throughput capacity, which results in low investment cost per unit of kraft liquor throughput. The volume of the reactor can be reduced to less than 1/100 of what is previously known and required.

Recovery of the physical heat content of the gas as process steam when cooling the gas from the gasification temperature of 800°–900° C. to the saturation temperature at the selected pressure, which at e g 40 bars amounts to about 200° C. At this temperature steam at 3–8 bars pressure can be generated when cooling the circulating green liquor and when cooling the gas and condensing its water vapor content downstream of the scrubbing tower.

Utilization of the gas for very efficient production of steam and electricity, e g in so called combined gas turbine/steam turbine cycle, whereby an electricity yield of around 50% can be achieved.

If, despite the rigorous scrubbing of the gas, some sulfur compounds would slip through the scrubbing tower, these compounds are completely converted to $SO_2$ in the subsequent combustion step, thereby eliminating bad smelling $H_2S$ and mercaptane emissions with the exhaust gases.

Theoretical investigations (Henry, R. E., and Fauske, H. K., Trans. Asme., J. HT Trans. 101(2):280, May 1979) show that melt/water explosions are avoided if the pressure is higher than 9 bars.

The invention will be described in more detail in the following with reference to the accompanying drawing which shows a flow sheet of a set up of equipment for carrying out the invention.

1 denotes a gasification reactor lined with refractory material. The reactor 1 is provided with an inlet 3 for black kraft liquor. A burner 4 is arranged for optional supply of heat. The liquor is introduced via a line 5, and atomizing gas (steam) is supplied via a line 6. Oxygen or oxygen containing gas is supplied via a line 7 connected to the reactor 1 via the burner 4. The reactor chamber opens downwardly into a quench water chamber 8 from which a bottom outlet 9 leads. This outlet 9 passes a steam generator 10, in which heat exchange takes place. The steam generated is used as a process steam used elsewhere, and is removed via a line 11. The outlet 9 containing green liquor passes green liquor to the pulp process 14 via a heat exchanger 12 for heating fresh supply water coming in, or passes green liquor to a scrubber 15, to the lower part thereof, and/or passes green liquor in return to the quench chamber 8. An outlet 16 from the quench chamber 8 leads the gas, mainly CO, $H_2$, $H_2S$, $CO_2$ and $H_2O$ to the scrubber 15. Purified gas leaves the scrubber 15 via the top thereof via a line 17 leading via an additional steam generator 18 to a condensor 19 for eliminating water present in the gas which is fed to a combustion chamber 20 and in which CO and $H_2$ are combusted to $CO_2$ and $H_2O$ by means of air added via a line 22. Exhaust gases generated are transferred to a gas turbine 23 where the gas is expanded to slightly above atmospheric pressure and said gas is then cooled in a waste heat boiler 21 to produce superheated high pressure steam connected to a back pressure steam turbine 24. Said turbines 23 and 24 are connected to a generator 25 for production of electricity. A chimney 26, or stack, is finally taking care of remaining exhaust gas ($CO_2$ and $H_2O$). Steam produced in the steam generator 18 is used as process steam, and boiler feed water is thereby supplied via a line 28, and is normally in the form of steam condensate. Green liquor is fed via a line 29 to the lower part of the scrubber 15. Water provided with $Na_2CO_3$ or NaOH 36 is supplied to the lower upper third of the scrubber 15 via a line 30. The water used is preferably the condensate from the condenser 19. On the top of the scrubber 15 water, preferably in form of condensate from the condenser 19, is supplied via a line 31. Combustion gas is if so required shunted away from the line 17 to supply the burner 3. Condensate water from the condenser 19 can also be supplied to the quench liquid chamber 8 via a line 33. Green liquor obtained in the scrubber 15 is recirculated to the quench chamber 8 via a line 34. The outlet 35 from the steam turbine is arranged to supply process steam 11.

Step 1—Gasification

The concentrated kraft black liquor is injected through an atomizing nozzle 2 located at the top of the refractory lined gasification reactor 1. Depending on the type of atomizing nozzle 3, steam, nitrogen (or other inert gas) or pressure can be used to achive the required dispersion of the black liquor. The placement of the atomizing nozzle(-s) can, however, be varied, as well, and can advantageously be placed at some distance from the top of the reactor, e.g., through the vertical jacket wall, and can as indicated consist of several nozzle, as well.

Air, oxygen or oxygen enriched air can be used as gasifcaton medium. When sprayed into the reactor the droplets of the kraft liquor undergo so called flash-pyrolysis, which is an endothermal process. In order to provide the required heat of reaction and to maintain the temperature in the reactor as given above which is necessary for complete conversion of the organic content of the black liquor to gas, oxygen, or air is added to the gasification reactor 1. The oxygen, or air, must be added in such a way that the hydrogen and carbon monoxide formed during the pyrolysis of the black liquor droplets react with the oxygen before the latter has had the time to come in contact with the pyrolysed droplets and oxidize their content of sulfides to sulfate or thio-sulfate. In order to maintain the heat balance around the gasification reator 1 some supplemantary combustion of e g oil or recirculated pyrolysis gas might be required. Such support-firing will, however, always be required during start-up and shut-down operations.

In order to achieve complete conversion of the organic substance to gas, mainly consisting of hydrogen, carbon monoxide, carbone dioxide, water vapor and hydrogen sulfide (and possibly also nitrogen) a temperature in the range of 800°–1000° C. is required at the outlet of the gasification reactor. At this temperature the sulfur and sodium is contained in the molten droplets mainly in the form af sodium carbonate and sodium sulfide. These droplets will partly hit the reactor walls and form a down-ward flowing film, which with the aid of the high gas velocity is transferred into the quench chamber 8 installed below the gasifier.

The refractory lined reactor 1 can be equipped with built-in cooling coils (not shown), whereby the wall temperature is controlled in such a way that a protective layer of solidified melt is formed on the refractory wall. If, on the other hand, it should be possible to find a refractory material, which has adequate resistance to the melt, a reactor design without cooling coils can be choosen.

Step 2—Gas cooling and scrubbing/recovery of chemicals

At the outlet 16 from the gasification reactor the gas with its entrained molten droplets is rapidly cooled through direct contact with water and the green liquor, which is formed when the droplets and the hydrogen sulfide are dissolved in the quench water. The main part of the cooling takes place as a result of evaporation of part or all of the quench liquid. The contact between the gas and the quench liquid can be accomplished in different ways, e g by passing the gas through a dip-tube of a water-trap, by injecting the cooling liquid into the gas stream or by a combination of these methods.

The temperature in the cooling and scrubbing step is governed by the selected operating pressure and is related to the temperature of saturated steam at this pressure. At an operation pressure of e g 40 bars an equilibrium temperatur in the order of 200° C. can be expected in the cooling/scrubbing step.

In the scrubber 15 down-stream of the quench chamber 8 the gas is washed in the bottom section with circulating green liquor. In the upper section of the scrubber the gas is first washed with a sodium carbonate, or sodium hydroxide solution and finally with water for complete removal of any remaining sulfur bearing compounds in the gas. A regenerative process for absorption/desorption of the gaseous sulfur compounds like an amine wash may constitute an alternative for producing a sulfur free gas.

As a result of the high operating pressure and the corresponding high temperature the heat absorbed in the cooling and scrubbing circuit can be recovered in steam generators 10, 18 by condensation of the water evaporated in the quench chamber 8 (heat exchanger 18) and by extracting physical heat from the circulating green liquor (heat exchanger 10). The steam can be generated at a pressure of approximately 5 bars which makes it suitable as process steam within the pulp and paper plant. In order to maintain the water balance of the total system, make-up water (e g condensate from the black liquor evaporation) is added to compensate for the water withdrawn from the system as green liquor. For heat recovery purposes the make-up water should be preheated in the heat exchanger 12 against the green liquor draw-off.

For final adjustment of the desired water vapor content of the gas from the scrubber 15 the gas is cooled down-stream of the steam generator 18 with cooling water in a heat exchanger. The condensate is routed back to the quench chamber 8 and to the scrubber 15.

Step 3—Energy recovery

Although some heat recovery took place in the preceeding step in the steam generators 10, 18, the major share of the energy recovery is performed in the third step, where the chemical energy of the gas is utilized. The sulfur and essentially water free gas, which is now available at about 35 bars and say 100° C., constitutes an excellent fuel for generation of steam and/or electricity. Due to the extreme cleanliness of the gas the steam and electricity production facilities 20, 23, 24 can be based on simple and low cost designs and yield very high energy efficiency. The most cost effective way of utilizing the gas is to generate electricity and back pressure steam in a combined gas turbine/steam turbine cycle, which operates as follows.

The gas is combusted with air under pressure in a combustion chamber 20 from where the exhaust gas passes a gas turbine 23 connected to a electric generator 25. The exhaust gas from the turbine 23 leaving at high temperature, then passes as waste heat boiler 28 which generates high pressure superheated steam. The steam is used to drive a back pressure steam turbine 24 connected on the same shaft as the above mentioned gas turbine 23, thereby increasing the electricity production. The back pressure of the steam turbine 24 is selected to suit the use of the removed steam as process steam. By such an arrangement an overall energy efficiency of 92–93% can be achieved and of the energy output up to 50% can be obtained as electricity. This results in a significantly higher overall yield of electricity from the waste liquor energy than is presently obtained in a conventional process.

I claim:

1. A process for recovering chemicals and energy from cellulose treatment waste liquors containing organic matter comprising:
   (i) introducing said waste liquor into a pressurized gasification reactor while being atomized and subjected to flash-pyrolysis thereby forming CO, $CO_2$, $H_2$, $H_2S$, $Na_2CO_3$ and $Na_2S$;
   (ii) introducing a gas selected from the group consisting of oxygen or an oxygen containing gas into said reactor in order to support endothermal pyrolysis reactions by combustion of a part of the gas formed by the pyrolysis of the organic matter present in said liquor;
   (iii) maintaining a temperature of at least 800° to 1300° C. and a pressure from 3 to 150 bars in said reactor to achieve complete gasification of the organic content of the waste liquor and to form droplets of melted inorganic chemicals comprising $Na_2CO_3$ and $Na_2S$;
   (iv) transporting said melt of chemicals out of said reactor into a quenching chamber by means of high velocity gas flow obtained during said gasification and cooling said gas and melt of chemicals through direct contact with an aqueous quench liquid;
   (v) washing the cooled gas from step (iv) with an alkaline solution in order to dissolve the chemical content thereof and in order to remove the sulfur bearing compounds from the pyrolysis gas; and
   (vi) removing said remaining gas and using it as a fuel for generating power.

2. A process according to claim 1, wherein the temperature of the reactor is maintained between 800°–1000° C.

3. A process according to claim 1, wherein the temperature in the gas cleaning and energy recovering steps of the process are maintained from 120° to 300° C.

4. A process according to claim 1, wherein the alkaline washing solution comprises sodium carbonate, sodium hydroxide or a mixture of sodium carbonate and sodium sulfide.

5. A process according claim 1, wherein said cooled gas is finally washed with water.

6. A process according to claim 1, wherein steam and electricity are generated in a combined gas and steam turbine cycle.

7. A process according to claim 1, wherein a support fuel is introduced into said reactor when needed in order to maintain the heat balance around said reactor.

8. A process according to claim 7, wherein said fuel is recirculated pyrolysis gas from the process.

9. A process according to claim 1, wherein the introduction of oxygen or oxygen containing gas takes place at some distance from the point of introducing the waste liquor into said reactor.

10. A process according to claim 2, wherein the temperature is maintained between 800°–900° C.

11. A process according to claim 1, wherein the pressure in the reactor is from 10 to 100 bars.

12. A process according to claim 11, wherein the pressure in the reactor is from 30 to 50 bars.

13. A process according to claim 3, wherein the temperature in the gas cleaning and energy recovering steps is maintained from 150° to 200° C.

* * * * *

UNITED STATES PATENT AND TRADEMARK OFFICE
CERTIFICATE OF CORRECTION

PATENT NO. : 4,808,264
DATED : February 28, 1989
INVENTOR(S) : Kignell

It is certified that error appears in the above-identified patent and that said Letters Patent is hereby corrected as shown below:

First page, third line of Item 56, "9/1962" should read --7/1962--;

Col. 2, line 14, "inorganid" should be --inorganic--;

Col. 2, line 64, "proces" should be --process--;

Col. 4, line 6, "nozzle 2" should be --nozzle 3--;

Col. 4, line 17, "gasifcaton" should be --gasification--;

Col. 4, line 31, "reator" should be --reactor--;

Col. 4, line 31, "supplemantary" should be --supplementary--;

Col. 4, line 38, "carbone" should be --carbon--; and

UNITED STATES PATENT AND TRADEMARK OFFICE
CERTIFICATE OF CORRECTION

PATENT NO. : 4,808,264

DATED : February 28, 1989

Page 2 of 2

INVENTOR(S) : Kignell

It is certified that error appears in the above-identified patent and that said Letters Patent is hereby corrected as shown below:

Col. 6, line 44, after "according" insert --to--.

Signed and Sealed this

Twenty-seventh Day of February, 1990

Attest:

JEFFREY M. SAMUELS

*Attesting Officer*   *Acting Commissioner of Patents and Trademarks*